(12) United States Patent
Young

(10) Patent No.: US 9,143,318 B1
(45) Date of Patent: Sep. 22, 2015

(54) SECURE RECOVERABLE OFFLINE STORAGE OF A SHARED SECRET

(71) Applicant: EMC Corporation, Hopkinton, MA (US)

(72) Inventor: Eric A. Young, Annerley (AU)

(73) Assignee: EMC Corporation, Hopkinton, MA (US)

( * ) Notice: Subject to any disclaimer, the term of this patent is extended or adjusted under 35 U.S.C. 154(b) by 177 days.

(21) Appl. No.: 13/793,130

(22) Filed: Mar. 11, 2013

(51) Int. Cl.
*H04L 9/32* (2006.01)
*H04L 9/08* (2006.01)

(52) U.S. Cl.
CPC ............... *H04L 9/08* (2013.01); *H04L 9/0838* (2013.01)

(58) Field of Classification Search
CPC ........................................................ H04L 9/08
USPC ........................................................ 713/171
See application file for complete search history.

(56) References Cited

U.S. PATENT DOCUMENTS

| | | | |
|---|---|---|---|
| 2008/0016334 A1* | 1/2008 | Kurapati et al. | 713/155 |
| 2008/0049942 A1* | 2/2008 | Sprunk et al. | 380/283 |
| 2012/0250862 A1* | 10/2012 | Bosson | 380/277 |
| 2012/0254125 A1* | 10/2012 | Bosson | 707/679 |
| 2013/0024697 A1* | 1/2013 | Zollinger et al. | 713/176 |
| 2013/0227287 A1* | 8/2013 | Quinlan et al. | 713/168 |

OTHER PUBLICATIONS

Hyochang Nam et al.,"Secure checkpointing," Journal of System Architecture, pp. 237-254, 2002.*
Emmanuel Bresson., "Dynamic Group Diffie-Hellman Key Exchange under Standard Assumptions," LNCS 2332, pp. 321-336, 2002.*

* cited by examiner

*Primary Examiner* — Luu Pham
*Assistant Examiner* — Canh Le
(74) *Attorney, Agent, or Firm* — Ryan, Mason & Lewis, LLP

(57) ABSTRACT

Methods, systems, apparatus and articles of manufacture for secure recoverable offline storage of a shared secret are provided herein. A method includes establishing a connection with a cryptographic device to access a first item of encrypted information maintained by the cryptographic device, wherein the first item of encrypted information comprises an item of cryptographic information encrypted with a first item of key information, decrypting the first item of encrypted information with a second item of key information to retrieve the item of cryptographic information, and encrypting the item of cryptographic information with a third item of key information to create a second item of encrypted information, wherein the third item of key information is associated with the cryptographic device.

20 Claims, 3 Drawing Sheets

SECURE RECOVERABLE OFFLINE STORAGE OF A SHARED SECRET

FIELD

The field relates generally to cryptography, and more particularly to data storage security.

BACKGROUND

In many situations, two (or more) systems, separate from each other, need to perform an operation or a form of processing using a shared secret. The shared secret can, by way of example, have been determined via a key agreement protocol. To protect the secret from being compromised, it is advantageous not to save a key associated with the secret to system storage, but rather, to maintain the key in system memory. Challenges arise, however, if either of the two (or more) system crashes or exits. In such a scenario, the key will be lost.

Nonetheless, existing storage security approaches include storing a shared secret on a storage disk. However, as noted, in such approaches, an attacker can retrieve the secret value from the storage. Additional existing approaches include encrypting a shared secret with a symmetric key and saving the shared secret with the symmetric key on a storage disk. However, in such approaches, if the storage is compromised, then both the encrypted secret and the key to decrypt that secret, as a result of being stored on the same storage, are vulnerable.

Accordingly, a need exists for storing a shared secret so that in the case of system failure and/or exit or restart, the secret can be recovered without an attacker being able to recover the key from storage media.

SUMMARY

One or more illustrative embodiments of the present invention provide secure recoverable offline storage of a shared secret.

In accordance with an aspect of the invention, a method is provided comprising the steps of establishing a connection with a cryptographic device to access a first item of encrypted information maintained by the cryptographic device, wherein the first item of encrypted information comprises an item of cryptographic information encrypted with a first item of key information, decrypting the first item of encrypted information with a second item of key information to retrieve the item of cryptographic information, and encrypting the item of cryptographic information with a third item of key information to create a second item of encrypted information, wherein the third item of key information is associated with the cryptographic device.

In accordance with another aspect of the invention, a system is provided comprising a first cryptographic device, a second cryptographic device, and a communication network connecting the first cryptographic device with the second cryptographic device. In connection with this system, the first cryptographic device encrypts an item of cryptographic information with a first item of key information associated with the second cryptographic device to create a first item of encrypted information. Additionally, the second cryptographic device establishes a connection with first cryptographic device, accesses the first item of encrypted information, decrypts the first item of encrypted information with a second item of key information to retrieve the item of cryptographic information, and encrypts the item of cryptographic information with a third item of key information to create a second item of encrypted information, wherein the third item of key information is associated with the first cryptographic device.

The data storage security techniques of the illustrative embodiments overcome one or more of the problems associated with the conventional techniques described previously, and provide a mechanism for storing an encrypted secret and the key to decrypt said secret on different systems. These and other features and advantages of the present invention will become more readily apparent from the accompanying drawings and the following detailed description.

DETAILED DESCRIPTION

As will be described, the present invention, in one or more illustrative embodiments, includes techniques for providing secure recoverable offline storage of a shared secret. By way of example, at least one embodiment of the invention includes enabling recovery of a shared secret after a system failure and/or exit, whereby a restarted process can recover the secret and continue with processing dependent on the secret.

Illustrative embodiments of the present invention will be described herein with reference to exemplary communication systems and/or processing devices. It is to be appreciated, however, that the invention is not restricted to use with the particular illustrative system and/or device configurations shown.

Accordingly, the term "communication system," as used herein, is intended to be broadly construed so as to encompass any type of system in which multiple processing devices can communicate with one another. Also, the term "cryptographic device," as used herein, is intended to be construed broadly so as encompass any type of processing device that incorporates cryptographic functionality (such as a computer, server, mobile telephone, radio-frequency identification (RFID) tag or reader, authentication token, etc.). Similarly, the term "authentication server" should be understood to encompass any type of processing device or set of such devices that is operative to authenticate information (such as, for example, a passcode) provided by an authentication token or other type of cryptographic device. As used herein, an "authentication server" need not be a network-based server, and may be implemented as a portion of a device that performs other functions, as a combination of multiple servers or other devices, or in other forms.

Additionally, the term "authentication information," as used herein, is intended to include passwords, passcodes, answers to life questions, or other authentication credentials, or values derived from such authentication credentials, or more generally any other information that a user may be required to submit in order to obtain access to an access-controlled application. Further, the term "key" or "key information," as used herein, refers to an item of information that determines a functional output of a cryptographic algorithm.

Similarly, the term "passcode," as used herein, is intended to include authentication information such as one-time passcodes (OTPs), or more generally any other information that may be utilized for cryptographic authentication purposes. Similarly, for completeness, a "shared secret," as used herein, refers to an information item only known to the relevant or identified parties. A shared secret could be calculated, for example, via a key agreement protocol.

Figure 1:
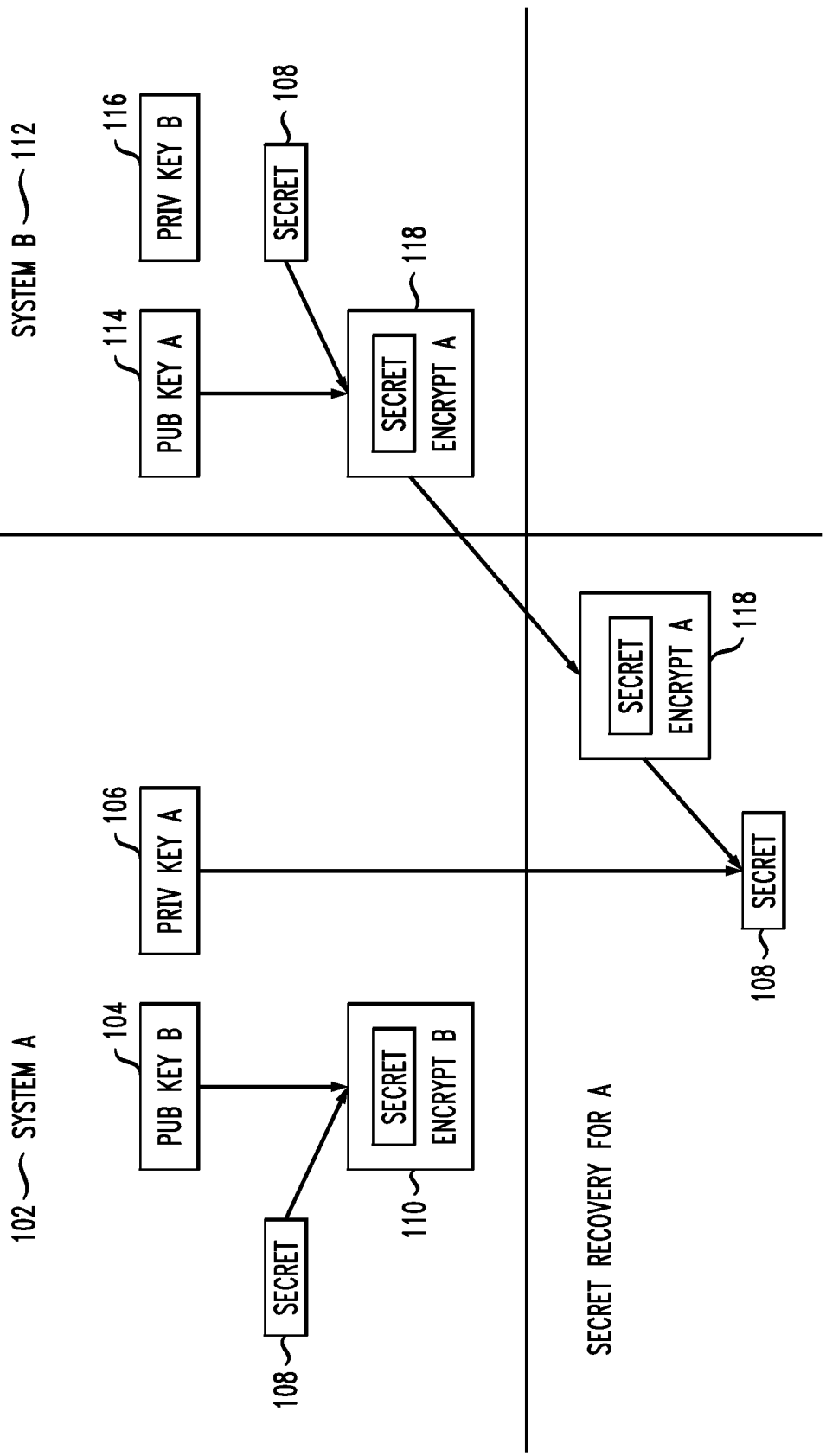
FIG. 1 is a block diagram illustrating an exemplary embodiment of the invention.

FIG. 1 is a block diagram illustrating an exemplary embodiment of the invention. By way of illustration, FIG. 1 depicts system A 102 and system B 112. It is to be appreciated that one or more embodiments of the invention can be implemented within a context including different numbers and configurations of systems, but for the purposes of illustration, FIG. 1 depicts an embodiment encompassing two systems. As illustrated, both systems maintain a private key with the corresponding public key known to its peer. As described herein, at least one embodiment includes the use of four keys (or, as also referred to herein, four items of key information), wherein the four keys (or four items of key information) represent two pairs of complementary values.

Specifically, as depicted in FIG. 1, system A 102 maintains private key A 106, while public key A 114 is known to system B 112. As noted above, the corresponding public key can be retrieved, for example, from a public repository. The corresponding public key can also be encapsulated in a digital certificate, which could be retrieved via several well known protocols.

Additionally, in accordance with at least one embodiment of the invention, system A 102 and system B 112 establish a shared secret 108. Such a shared secret can be established, for example, by using a key agreement protocol such as Diffie-Hellman (DH) or Elliptic Curve Diffie-Hellman (ECDH). An alternative source for establishing the shared secret can include protocols such as, for example, secure sockets layer (SSL)/transport layer security (TLS) or Kerberos. The shared secret 108 can be needed for performance of one or more operations by the two systems. By way of example, the shared secret 108 can be needed to perform an update to a state held on both system A 102 and system B 112. By way of further example, the shared secret can be used to encrypt messages that are to be transferred between the two systems (via symmetric encryption). In such a context, it would be advantageous to maintain the key for a significant length of time so that prior messages that may be stored on a disk can be decrypted. Accordingly, so as to update data "at rest," or manipulate data, the key is to be preferably available for a prolonged period of time, even if the machine has to restart.

If system A 102 and/or system B 112 crashes or exits, it is critical for the system (that is, the system that crashed or exited), when restarted, to continue its processing with the same shared secret 108 that was initially established between the two systems. If the shared secret 108 cannot be recovered, system A 102 and system B 112 will be in an inconstant state, and unless there is a rollback capacity, the two systems will have a corrupt state. By way of illustration, when an operation with the secret is started, wherein the operation is to occur on both systems, there exists a need to be able to continue the process if the process is interrupted, or to be able to rollback the operation. As used herein, rollback refers to the ability to keep both the old copy and the new copy of the data (associated with the operation), and only delete the old copy when it is known or established that both sides (that is, systems) have finished processing the data with the secret. An example scenario includes updating a key used to encrypt data stored on machines that have mirrored each other's data. A challenge associated with being able to rollback is that the amount of storage required can be approximately doubled, which often will not be feasible. Also, for a real-time system, the data could continue to be modified and have additions made thereto, complicating the process of adding updates when a rollback mechanism is also available. The rollback capability requires all updates to stop, which can allow greater flexibility for updating parts of the data while other parts are updated separately.

As noted above, existing approaches include saving the secret on local storage. As such, when a crashed system restarts, the system can reload the secret and continue processing. However, as noted above, this approach is disadvantageous because an attacker can easily recover the secret from the local storage.

Accordingly, at least one embodiment of the invention includes techniques as depicted in FIG. 1. Specifically, both system A 102 and system B 112 encrypt the shared secret 108 with the public key of the respective peer system and save that encrypted version of the secret to storage. As illustrated in FIG. 1, system A 102 encrypts the shared secret 108 with the public key of system B (public key B) 104 to create an encrypted version of the secret 110, which system A 102 maintains in storage (for example, in the local storage on system A 102). Similarly, system B 112 encrypts the shared secret 108 with the public key of system A (public key A) 114 to create an encrypted version of the secret 118, which system B 112 maintains in storage. As detailed herein, at least one embodiment of the invention implements the above-noted encryption with a public key system. Such an embodiment includes the use of one key that encrypts the data and another key that decrypts the data. Algorithms that can be implemented to carry out the above-noted encryption can include, for example, the RSA algorithm, and the Elliptic Curve Integrated Encryption Scheme (ECIES).

Additionally, in accordance with the example embodiment of the invention illustrated in FIG. 1, if a system restarts, that system establishes a connection with its respective peer system and retrieves the secret which has been encrypted with its public key. As depicted in FIG. 1, the shared secret recovery for system A 102 (for example, after a failure or exit by system A 102) includes (re)establishing a connection with system B 112 (for example, via a specific protocol to retrieve the encrypted secret), and retrieving the shared secret 108 via accessing the encrypted version of the secret 118 that is maintained by system B 112. Note that this encrypted version of the secret 118 had previously been generated by system B 112 via encryption of the shared secret 108 with the public key of system A (public key A) 114. As detailed herein, system A 102 would know its corresponding public and private key values. As would be appreciated by one skilled in the art, the private key is kept safe, and the corresponding public key is often bound to an identity which is signed by a trusted authority, producing a certificate. Accordingly, the public key can be maintained anywhere as a public value. As noted herein, in accordance with at least one embodiment of the invention, the public key (perhaps wrapped in a certificate) can be maintained locally, copied down during a registration process, or the public key can be retired at run-time via a certificate distribution protocol.

To retrieve the shared secret 108 via the encrypted version of the secret 118, system A 102 can decrypt the encrypted version of the secret 118 with its private key (priv key A) 106. As described herein, the public key and the private key are the two keys needed to implement a public key encryption system. One key encrypts the data and the other key decrypts the data. Similarly, if the roles of the two systems were reversed, system B 112 could use its private key (priv key B) 116 for decryption purposes to retrieve the secret. Further, in accordance with at least one embodiment of the invention, this decryption operation remains in the memory of system A 102, and is not written into storage.

Accordingly, because the encrypted secret (for example, encrypted version of the secret 118) and the key to decrypt the secret (for example, private key A 106) are maintained on different systems (or, in an example embodiment of the invention, on the storage attached to different systems), the two systems must co-operate to be able to retrieve the secret value. Alternatively, the live running system would need to be compromised for such a retrieval to occur.

Further, in accordance with at least one embodiment of the invention, if an attacker compromises the storage of one system (for example, system B 112), the attacker will be unable to decrypt the secret because the secret maintained on the storage of the system has been encrypted (for example, secret 118) so that only the peer system (for example, system A 102) can decrypt the secret. The attacker may also, for example, have access to the private key (for example, priv key B 116), but the attacker would be unable to decrypt secret 118 (due to possessing the wrong key) because the attacker would need encrypted secret 110. Additionally, in one example embodiment of the invention, the private key of a system (106 or 116) is kept on a hardware security module (HSM). A HSM is a device used to store a private key, and is capable of performing operations using that private key without revealing the private key. This means that, in such a context, operations using that private key can only be performed on the device to which the HSM is connected.

A compromised private key on a system (for example, private key A 106 on system A 102) can only be used to decrypt the peer's version of the encrypted secret (for example secret 118), and not the secret saved on the local storage of the compromised system (for example, system A 102) because that version of the secret (for example 110) is encrypted with the public key of the peer (for example, public key B 104).

Further, in accordance with at least one embodiment of the invention, the systems involved in implementing these techniques (for example, system A 102 and system B 112) do not share storage for their encrypted secrets (110 and 118, respectively) or their private keys (106 and 116, respectively).

Figure 2:
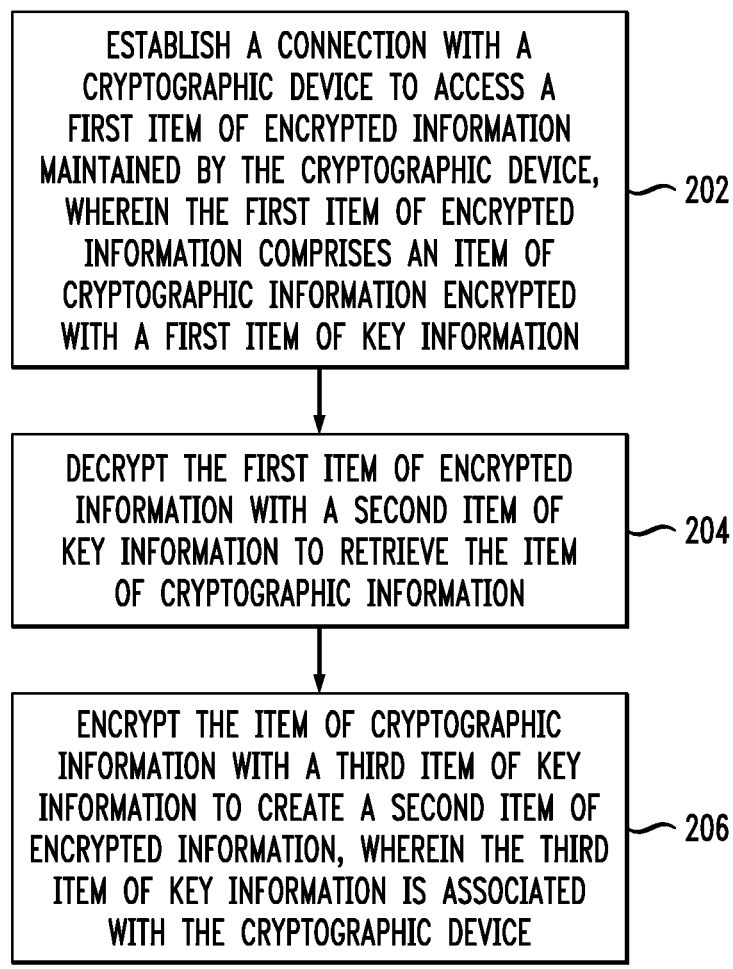
FIG. 2 is a flow diagram illustrating techniques according to an embodiment of the invention.

FIG. 2 is a flow diagram illustrating techniques according to an embodiment of the present invention. Step 202 includes establishing a connection with a cryptographic device to access a first item of encrypted information maintained by the cryptographic device, wherein the first item of encrypted information comprises an item of cryptographic information encrypted with a first item of key information. The item of cryptographic information is shared with the cryptographic device. Also, establishing a connection with the cryptographic device can include establishing a connection subsequent to at least one of a failure and an exit. Further, the first item of key information can include a public key associated with the entity accessing the first item of encrypted information.

Step 204 includes decrypting the first item of encrypted information with a second item of key information to retrieve the item of cryptographic information. The second item of key information can include a private key associated with the device decrypting the second item of encrypted information. Additionally, the private key can be maintained on a hardware security module. Also, at least one embodiment of the invention includes maintaining the first item of encrypted information in a memory component.

Step 206 includes encrypting the item of cryptographic information with a third item of key information to create a second item of encrypted information, wherein the third item of key information is associated with the cryptographic device. The third item of key information associated with the cryptographic device can include a public key of the cryptographic device.

As detailed herein, the item of cryptographic information can include a shared secret with the cryptographic device required for execution of one or more operations. Additionally, at least one embodiment of the invention includes establishing the item of cryptographic information with the cryptographic device.

Security techniques of the type described above in conjunction with FIGS. 1-2 may be implemented in a wide variety of different applications. One example communication system application is detailed with reference to FIG. 3.

Figure 3:
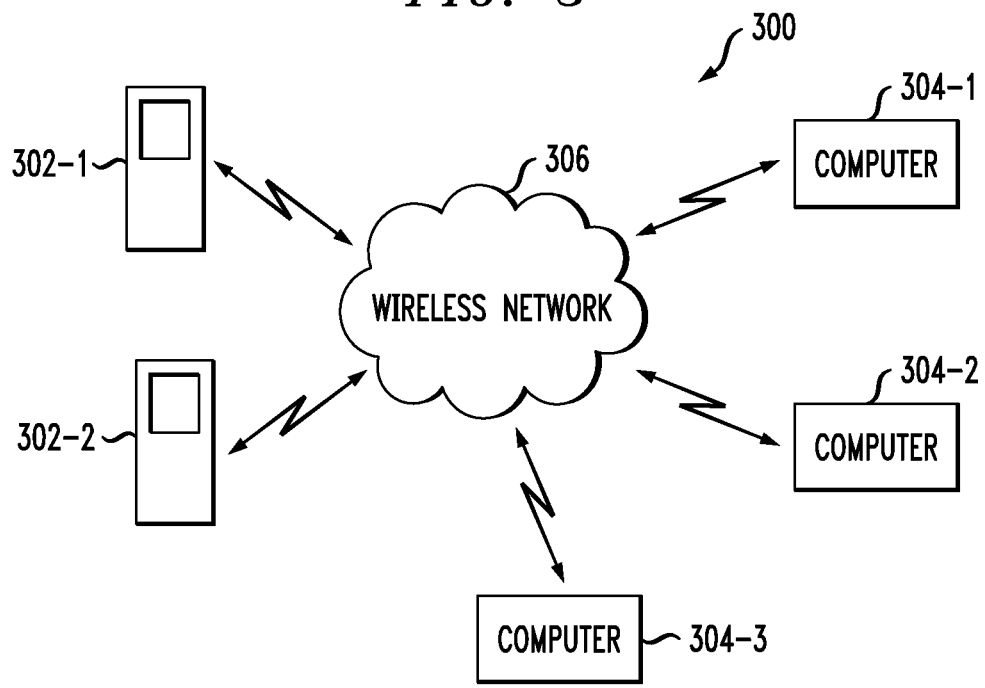
FIG. 3 is a diagram illustrating an example communication system that may incorporate data storage security functionality of at least one embodiment of the invention.

Referring initially to FIG. 3, a communication system 300 comprises a plurality of mobile telephones 302-1 and 302-2 and computers 304-1, 304-2 and 304-3, configured to communicate with one another over a network 306. Any two or more of the devices 302 and 304 may correspond to respective system A (102) and system B (112) configured to implement techniques for providing secure recoverable offline storage of a shared secret, as described herein.

It is to be appreciated that the techniques disclosed herein can be implemented in numerous other applications.

By way of example, at least one embodiment of the invention includes an implementation within a system (for example, a communication system) involving two cryptographic devices. The system includes a first cryptographic device (such as, for example, system B 112 in FIG. 1), a second cryptographic device (such as, for example, system A 102 in FIG. 1), and a communication network connecting the first cryptographic device with the second cryptographic device. In such a system, the first cryptographic device encrypts an item of cryptographic information (for example, a shared secret) with a first item of key information associated with the second cryptographic device (such as, for example, public key A 114 in FIG. 1) to create a first item of encrypted information (such as, for example, secret 118 in FIG. 1). Additionally, the second cryptographic device establishes a connection with first cryptographic device, accesses the first item of encrypted information, decrypts the first item of encrypted information with a second item of key information (such as, for example, private key A 106 in FIG. 1) to retrieve the item of cryptographic information, and encrypts the item of cryptographic information with a third item of key information (such as, for example, public key B 104) to create a second item of encrypted information (such as, for example, secret 110), wherein the third item of key information is associated with the first cryptographic device.

As detailed herein, the second cryptographic device can also encrypt the item of cryptographic information with a third item of key information associated with the first cryptographic device (such as, for example, public key B 104 in FIG. 1) to create a second item of encrypted information (such as, for example, secret 110 in FIG. 1). Additionally, in at least one embodiment of the invention, the second cryptographic device maintains the first item of encrypted information in a memory component.

Further, the item of cryptographic information can include a secret shared by the first cryptographic device and the second cryptographic device, wherein the secret is required for execution of one or more operations by at least one of the first cryptographic device and the second cryptographic device.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code is downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and configured to perform the techniques detailed herein. Also, as described herein, aspects of the present invention may take the form of a computer program product embodied in a computer readable medium having computer readable program code embodied thereon.

Figure 4:
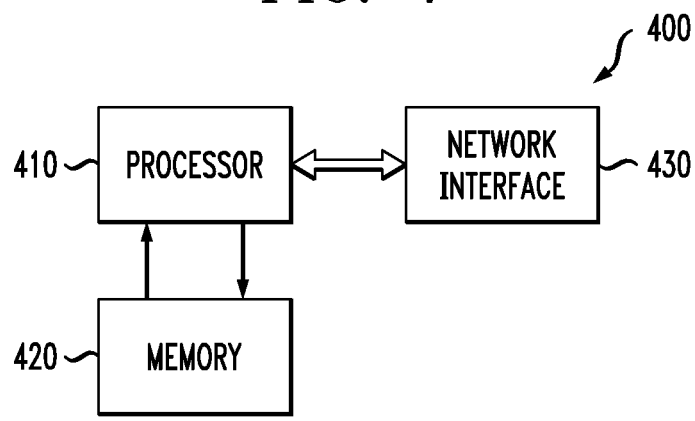
FIG. 4 is a system diagram of an exemplary system on which at least one embodiment of the invention can be implemented.

Accordingly, FIG. 4 is a system diagram of an exemplary system on which at least one embodiment of the invention can be implemented. FIG. 4 illustrates one possible implementation of a system or other processing device of the example embodiment of the invention illustrated in FIG. 1. The processing device 400 as shown may be viewed as representing, for example, system A 102 or system B 112. The processing device 400 in this implementation includes a processor 410 coupled to a memory 420 and a network interface 430. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 420 and executed by the corresponding processor 410. The memory 420 is also used for storing information used to perform computations or other operations associated with the disclosed data security techniques.

The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc.

The processing device 400 as shown in FIG. 4 may represent, for example, an implementation of system A and/or system B as depicted in FIG. 1. Additionally, system A and/or system B may take the form of one or more cryptographic devices such as, for example, a portable device, such as a mobile telephone, personal digital assistant (PDA), wireless email device, game console, etc. Such a system may alternatively represent a desktop or laptop personal computer (PC), a microcomputer, a workstation, a mainframe computer, a wired telephone, a television set top box, or any other information processing device which can benefit from the use of data security techniques in accordance with the invention. Additionally, the memory 420 can include a storage device, as detailed in various examples above, that stores and/or maintains encrypted secret 110 and/or encrypted secret 118 (as depicted in FIG. 1).

The system may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a system, a person utilizing or otherwise associated with the device, or a combination of both the person and the device.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from data storage security. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    establishing, via a first cryptographic device, an item of cryptographic information to be shared between the first cryptographic device and a second cryptographic device prior to a connection termination between the first cryptographic device and the second cryptographic device, wherein at least a portion of the item of cryptographic information is generated externally from the first cryptographic device and the second cryptographic device, and wherein said connection termination comprises at least one of (i) a connection failure and (ii) an exit from the connection by at least one of the first cryptographic device and the second cryptographic device;
    re-establishing, via the first cryptographic device and subsequent to the connection termination, a connection with the second cryptographic device to access a first item of encrypted information maintained in a local storage component of the second cryptographic device, wherein the first item of encrypted information comprises the item of cryptographic information encrypted using a first item of key information;
    decrypting, via the first cryptographic device, the first item of encrypted information using a second item of key information to retrieve the item of cryptographic information;
    encrypting, via the first cryptographic device, the item of cryptographic information using a third item of key information to create a second item of encrypted information, wherein the third item of key information is associated with the second cryptographic device; and
    storing the second item of encrypted information in a local storage component of the first cryptographic device.

2. The method of claim 1, wherein the first item of key information comprises a public key associated with the first cryptographic device.

3. The method of claim 1, wherein the second item of key information comprises a private key associated with the first cryptographic device.

4. The method of claim 3, wherein the private key is maintained on a hardware security module.

5. The method of claim 1, wherein the third item of key information comprises a public key of the second cryptographic device.

6. An article of manufacture comprising a non-transitory processor-readable storage medium having processor-readable instructions tangibly embodied thereon which, when implemented, cause a processor to carry out steps comprising:
    establishing, via a first cryptographic device, an item of cryptographic information to be shared between the first cryptographic device and a second cryptographic device prior to a connection termination between the first cryptographic device and the second cryptographic device, wherein at least a portion of the item of cryptographic information is generated externally from the first cryptographic device and the second cryptographic device, and wherein said connection termination comprises at least one of (i) a connection failure and (ii) an exit from the connection by at least one of the first cryptographic device and the second cryptographic device;
    re-establishing, via the first cryptographic device and subsequent to the connection termination, a connection with the second cryptographic device to access a first item of encrypted information maintained in a local storage component of the second cryptographic device, wherein the first item of encrypted information comprises the item of cryptographic information encrypted using a first item of key information;
    decrypting, via the first cryptographic device, the first item of encrypted information using a second item of key information to retrieve the item of cryptographic information;
    encrypting, via the first cryptographic device, the item of cryptographic information using a third item of key information to create a second item of encrypted information, wherein the third item of key information is associated with the second cryptographic device; and
    storing the second item of encrypted information in a local storage component of the first cryptographic device.

7. An apparatus comprising:
    a memory; and
    at least one processor coupled to the memory; and
    one or more modules executing on the at least one processor, wherein the one or more modules comprise:
    a module to establish, via a first cryptographic device, an item of cryptographic information to be shared between the first cryptographic device and a second cryptographic device prior to a connection termination between the first cryptographic device and the second cryptographic device, wherein at least a portion of the item of cryptographic information is generated externally from the first cryptographic device and the second cryptographic device, and wherein said connection termination comprises at least one of (i) a connection failure and (ii) an exit from the connection by at least one of the first cryptographic device and the second cryptographic device;

a module to re-establish, via the first cryptographic device and subsequent to the connection termination, a connection with the second cryptographic device to access a first item of encrypted information maintained in a local storage component of the second cryptographic device, wherein the first item of encrypted information comprises the item of cryptographic information encrypted using a first item of key information;

a module to decrypt, via the first cryptographic device, the first item of encrypted information using a second item of key information to retrieve the item of cryptographic information;

a module to encrypt, via the first cryptographic device, the item of cryptographic information using a third item of key information to create a second item of encrypted information, wherein the third item of key information is associated with the second cryptographic device; and a module to store the second item of encrypted information in a local storage component of the first cryptographic device.

8. The apparatus of claim 7, wherein the first item of key information comprises a public key associated with a given entity accessing the first item of encrypted information.

9. A system comprising:

a first cryptographic device;

a second cryptographic device;

an item of cryptographic information shared between the first cryptographic device and the second cryptographic device that is established prior to a connection termination between the first cryptographic device and the second cryptographic device, wherein at least a portion of the item of cryptographic information is generated externally from the first cryptographic device and the second cryptographic device, and wherein said connection termination comprises at least one of (i) a connection failure and (ii) an exit from the connection by at least one of the first cryptographic device and the second cryptographic device; and a communication network connecting the first cryptographic device with the second cryptographic device; wherein:

the first cryptographic device is configured to:
encrypt the item of cryptographic information using a first item of key information associated with the second cryptographic device to create a first item of encrypted information; and
store the first item of encrypted information in a local storage component of the first cryptographic device; and the second cryptographic device is configured to:
re-establish, subsequent to the connection termination, a connection with first cryptographic device;
access the first item of encrypted information;
decrypt the first item of encrypted information using a second item of key information to retrieve the item of cryptographic information;
encrypt the item of cryptographic information using a third item of key information to create a second item of encrypted information, wherein the third item of key information is associated with the first cryptographic device; and
store the second item of encrypted information in a local storage component of the second cryptographic device.

10. The system of claim 9, wherein the first item of key information comprises a public key of the second cryptographic device.

11. The system of claim 9, wherein the second item of key information comprises a private key associated with the second cryptographic device.

12. The system of claim 9, wherein the third item of key information associated with the first cryptographic device comprises a public key of the first cryptographic device.

13. The system of claim 9, wherein the item of cryptographic information is required for execution of one or more operations by at least one of the first cryptographic device and the second cryptographic device.

14. The apparatus of claim 7, wherein the second item of key information comprises a private key associated with the first cryptographic device.

15. The apparatus of claim 7, wherein the third item of key information comprises a public key of the second cryptographic device.

16. The article of manufacture of claim 6, wherein the first item of key information comprises a public key associated with the first cryptographic device.

17. The article of manufacture of claim 6, wherein the second item of key information comprises a private key associated with the first cryptographic device.

18. The article of manufacture of claim 17, wherein the private key is maintained on a hardware security module.

19. The article of manufacture of claim 6, wherein the third item of key information comprises a public key of the second cryptographic device.

20. The method of claim 1, wherein the item of cryptographic information is required for execution of one or more operations by at least one of the first cryptographic device and the second cryptographic device.

* * * * *